United States Patent
Vincent

(10) Patent No.: US 9,201,612 B1
(45) Date of Patent: Dec. 1, 2015

(54) UTILIZING SHARED STORAGE FOR EFFICIENT VM-HA

(75) Inventor: Pradeep Vincent, Kenmore, WA (US)

(73) Assignee: Amazon Technologies, Inc., Seattle, WA (US)

(*) Notice: Subject to any disclaimer, the term of this patent is extended or adjusted under 35 U.S.C. 154(b) by 780 days.

(21) Appl. No.: 13/277,934

(22) Filed: Oct. 20, 2011

(51) Int. Cl.
*G06F 12/00* (2006.01)
*G06F 3/06* (2006.01)
*G06F 9/455* (2006.01)
*G06F 12/08* (2006.01)

(52) U.S. Cl.
CPC .......... *G06F 3/0662* (2013.01); *G06F 9/45533* (2013.01); *G06F 12/08* (2013.01); *G06F 2009/45562* (2013.01)

(58) Field of Classification Search
CPC ... G06G 12/08; G06F 12/0826; G06F 12/084; G06F 12/1009; G06F 12/08; G06F 3/0662; G06F 9/45533; G06F 2009/45562
USPC .......................................................... 711/6
See application file for complete search history.

(56) References Cited

U.S. PATENT DOCUMENTS

| | | | |
|---|---|---|---|
| 7,962,703 B1* | 6/2011 | Shah et al. ..................... | 711/154 |
| 8,806,266 B1* | 8/2014 | Qu et al. ....................... | 714/4.11 |
| 2009/0113109 A1* | 4/2009 | Nelson et al. ................. | 711/6 |
| 2011/0047546 A1* | 2/2011 | Kivity et al. .................. | 718/1 |
| 2011/0167194 A1* | 7/2011 | Scales et al. .................. | 711/6 |
| 2011/0320556 A1* | 12/2011 | Reuther ....................... | 709/213 |

OTHER PUBLICATIONS

Cully, B. et al. "Remus: High Availability via Asynchronous Virtual Machine Replication," presented at NDIS on Apr. 17, 2008, 14 pps., [online][retrieved on Oct. 21, 2011] retrieved from: http://www.usenix.org/events/nsdi08/tech/full_papers/cully/cully_html/.

* cited by examiner

*Primary Examiner* — Aracelis Ruiz
(74) *Attorney, Agent, or Firm* — Lee & Hayes, PLLC

(57) ABSTRACT

Technologies are described herein for utilizing shared storage for efficient VM-HA. During the replication of the state of a primary virtual machine to a replicated virtual machine hosted on a secondary host, a request from the primary virtual machine is received to write a dirty page of guest memory to a shared storage device. Upon receiving the request, replication metadata indicating the location of the page of guest memory on the shared storage device is sent to the secondary host computer causing the secondary host computer to retrieve the dirty page of guest memory from the shared storage device during synchronization instead of the dirty page of guest memory having to be copied directly from the primary virtual machine to the secondary host computer.

21 Claims, 7 Drawing Sheets

UTILIZING SHARED STORAGE FOR EFFICIENT VM-HA

BACKGROUND

Virtual machine high-availability ("VM-HA") is a category of virtualization technologies and products that provide for the replication, or "mirroring," of virtual machines ("VMs"), usually across different physical servers or hosts. For example, a primary virtual machine running on one host may be replicated on a secondary host. If the primary virtual machine goes down, because of a hardware failure, an operating system failure, or some other failure, the replicated virtual machine on the secondary host may assume the role of the failed virtual machine. In other examples, the virtual machines may be running on the same physical server and/or each virtual machine may operate as both primary and secondary (replicated) virtual machines. VM-HA provides high availability of the services provided by the virtual machines and reduces downtime for consumers of the services in the event of a failure. In addition, because the replication is performed at the virtual machine level, VM-HA may provide this high availability independent of and transparent to the operating systems and applications executing in the virtual machines, and does not require application-specific configuration or synchronization methods.

A virtual machine monitor ("VMM") executing on the hosts in the VM-HA environment may monitor the activity of the primary virtual machine and may replicate the state of the virtual machine between a primary computer system and a secondary computer system, while maintaining state consistency. In the instance that a failure of the primary virtual machine is detected, the replicated virtual machine on the secondary computer system can take over operations, thus allowing the replicated virtual machine to provide the services of the failed primary computer system with minimal downtime. Various techniques exist for the VMM to replicate state across virtual machines. For example, the VMM may transfer the CPU and virtual device inputs from the primary virtual machine to the replicated virtual machine to be replayed, ensuring that the replicated virtual machine is continuously synchronized with the primary virtual machine. However, because all non-deterministic events of the primary virtual machine must also be replicated to the secondary virtual machine, such replication techniques may affect the performance of the primary virtual machine.

In another example, the VMM may utilize a technique analogous to "live migration," in which the state as embodied in the memory of the primary virtual machine is replicated to the replicated virtual machine on the secondary host in real-time, while the primary virtual machine continues to run on the primary host. During replication, writes to the memory of the primary virtual machine by the guest operating system ("OS") and associated applications are trapped by the VMM, and "dirtied" pages of guest memory are copied to the replicated virtual machine on the secondary host. At certain intervals, or "checkpoints," the execution of the guest OS and applications on the primary virtual machine is suspended, and the remaining dirty pages of guest memory are copied to the replicated virtual machine along with the current CPU state. While the impact on performance of the primary virtual machine is minimal with the live migration technique of replication, replication of the pages of guest memory between the primary virtual machine and the replicated virtual machine on the secondary host may generate excessive network traffic and may be inefficient.

It is with respect to these and other considerations that the disclosure made herein is presented.

DETAILED DESCRIPTION

Figure 1:
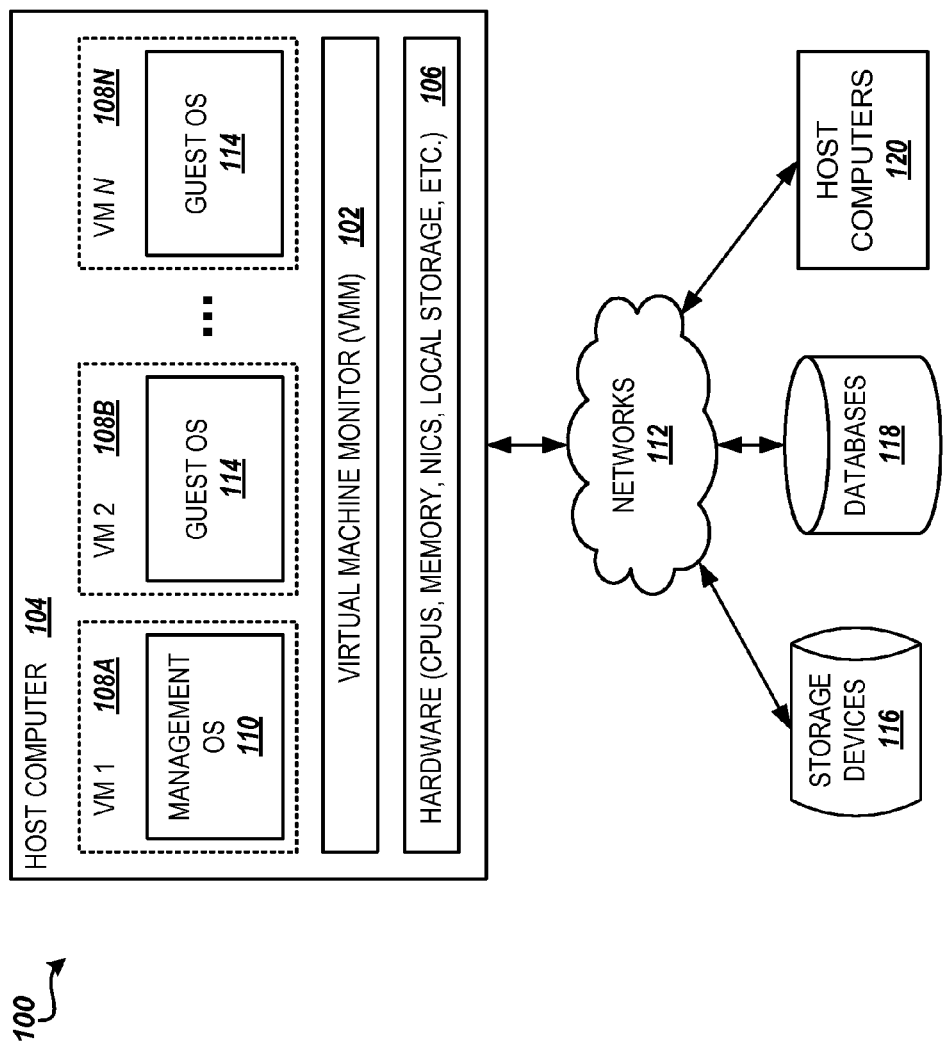
FIG. 1 is a block diagram showing aspects of an illustrative virtualization system, including several software and hardware components provided by embodiments presented herein.

The following detailed description is directed to technologies for utilizing shared storage for efficient VM-HA. As discussed above, many traditional VM-HA environments utilize a "live migration" technique to replicate the state of a primary virtual machine to a replicated virtual machine hosted on a secondary host. While the impact on performance of the primary virtual machine is minimal with this live migration technique, replication of the pages of guest memory between the primary virtual machine and the replicated virtual machine on the secondary host may generate excessive network traffic and may be inefficient.

However, most applications and/or operating systems periodically flush the state of the memory and/or the CPU to a storage device for the sake of persistence. For example, the guest operating system may issue write operations to commit pages of memory to a local storage device. In addition, the guest OS may also issue write operations to write pages of memory to a page cache on a local storage device in order to provide virtual memory for applications. In this scenario, the state of these pages of guest memory in the primary virtual machine may exist on the storage device. Utilizing the technologies described herein, the secondary host is provided access to the storage device and may retrieve pages of guest memory from the shared storage device during synchronization, eliminating the need for the dirty pages of guest memory written to the shared storage device to also be copied directly to the secondary host across the network, thus reducing bandwidth required for replication. In addition, the VMM in the VM-HA may predictively write dirty pages of guest memory to the shared storage device to further reduce the number of pages of guest memory being copied across the network.

It should be appreciated that the subject matter presented herein may be implemented as computer process, a computercontrolled apparatus, a computing system, or an article of manufacture, such as a computer-readable storage medium. These and various other features and embodiments will become apparent from a reading of the following disclosure and a review of the associated drawings.

While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced on or in conjunction with other computer system configurations beyond those described below, including multiprocessor systems, microprocessor-based or programmable consumer electronics, minicomputers, mainframe computers, handheld computers, personal digital assistants, cellular telephone devices, electronic-book readers, special-purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

FIG. 1 is a block diagram of an example virtualization architecture 100, according to embodiments. The virtualization architecture 100 includes a virtual machine monitor ("VMM") 102, also referred to as a hypervisor, that allows multiple, independent guest operating systems to concurrently execute on a single host computer 104. The VMM 102 abstracts the hardware of the host computer 104 to create one or more virtual machines 108A-108N (referred to herein generally as virtual machine 108). The VMM 102 may be implemented in the hardware of the host computer 104, or it may be implemented as a software module that executes at a low-level in the host computer to provide services to the virtual machines 108.

One virtual machine 108A may host a management OS 110. The management OS 110 may be automatically started by the VMM 102 upon startup of the host computer 104, and may provide administrators of the host computer tools and facilities for managing the VMM and the other virtual machines 108B-108N. The virtual machine 108A hosting the management OS 110 may execute at a higher privilege level than the other virtual machines 108B-108N, and the management OS may also provide services to the other virtual machines through the VMM 102, such as loading of hardware drivers for the host computer, virtualizing hardware devices within virtual machines 108B-108N, arbitrating access to the hardware of the host computer 104, and the like. In a specific embodiment, the management OS 110 may be a specifically modified version of the LINUX operating system, for example.

The other virtual machines 108B-108N may each run an instance of a guest OS 114 as well as execute one or more applications to provide services to consumers across one or more networks 112. According to one embodiment, the VMM 102 may support both paravirtualized and unmodified guest OSs 114. A paravirtualized guest OS 114 is modified to run in a virtual machine 108 provided by the VMM 102, while an unmodified guest OS 114 may be a version of an operating system that is that is configured to execute directly on physical hardware. Guest OSs 114 may include the MICROSOFT® WINDOWS® operating system from MICROSOFT Corporation of Redmond, Wash., the ORACLE® SOLARIS operating system from ORACLE Corporation of Redwood City, Calif., the LINUX operating system, the UNIX operating system, the NetBSD operating system, and the like.

It will be appreciated that the embodiments described herein are applicable to other virtualization architectures beyond the virtualization architecture 100 described above and shown in FIG. 1. For example, the management OS 110 may run directly above and control access to the hardware resources 106 of the host computer 104. In addition, while FIG. 1 shows the VMM as separate from the management OS, embodiments where the functionality of the management OS and VMM are integrated are within the scope of this disclosure.

According to embodiments, the VMM 102, in conjunction with the management OS 110, controls the allocation and sharing of hardware resources 106 of the host computer 104 amongst the virtual machines 108. The hardware resources 106 may include central processing units ("CPUs") or processors, physical memory, network interface cards ("NICs"), local storage devices, input/output ("I/O") controllers, and the like. For example, each virtual machine 108 may be allocated a portion of the physical memory of the host computer 104, depending on the requirements of the guest OS 114 and/or parameters specified by an administrator. The VMM 102 may present the allocated portion of physical memory to each VMM 102 as a contiguous memory address space starting at a guest physical address of zero. The VMM 102 may maintain memory-mapping tables to translate guest physical memory addresses accessed by the guest OS 114 executing in the virtual machine 108 to system physical addresses on the host computer 104. Similarly, the VMM 102, in conjunction with the management OS 110, may control access of the guest OS 114 and applications executing in the virtual machines 108 to storage devices 116, databases 118, other host computers 120, and the like across the networks 112.

Figure 2:
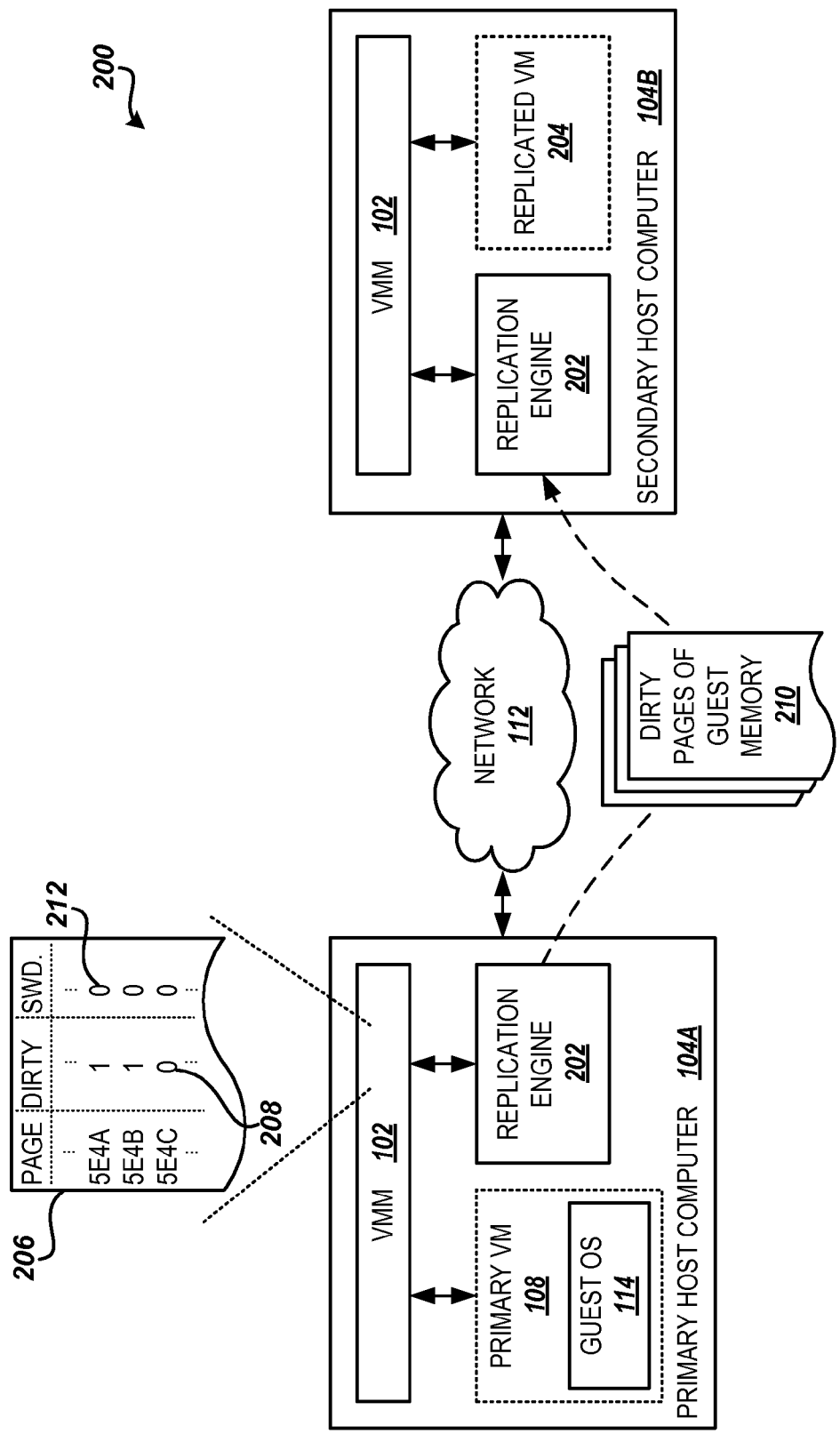
FIG. 2 is a block diagram showing an illustrative VM-HA environment that utilizes a live migration technique for replicating the state of a primary virtual machine to a replicated virtual machine, according to embodiments presented herein.

FIG. 2 shows an example VM-HA environment 200, according to embodiments. A primary virtual machine 108 is run by a primary host computer 104A, and executes a guest OS 114 and one or more applications (not shown) to provide services to consumers over the network 112. In addition, the primary virtual machine 108 is replicated to a secondary host computer 104B, across the network 112. According to one embodiment, the VMM 102 of the secondary host computer 104B maintains a replicated virtual machine 204 in a stand-by state on the secondary host computer 104B such that it may be started in the event of a failure of the primary virtual machine 108 caused by hardware failure on the primary host computer 104A or some other failure.

According to embodiments, the VMM 102 on the primary host computer 104A monitors the activity of the primary virtual machine 108 and the guest OS 114 and applications executing therein and performs replication of the state of the primary virtual machine 108 to the replicated virtual machine 204 on the secondary host computer 104B. The replication may be performed by a replication engine 202 executing on the primary host computer 104A and/or the secondary host computer 104B. The replication engine 202 may represent a component of the VMM 102, a component executing in the management OS 110 or the VMM 102, or any combination of these and other components on the primary and/or secondary host computers 104.

As described above, the replication engine 202 may utilize a technique analogous to continuous "live migration" to replicate the state of the primary virtual machine 108 to the secondary host computer 104B. According to embodiments, the VMM 102 maintains a memory page map 206 for each virtual machine 108 that contains a dirty flag 208 for each page of guest memory in the virtual machine that indicates if the page is "dirty," i.e., has been written to. During operation of the primary virtual machine 108, writes to the memory of the primary virtual machine by the guest OS 114 are trapped by the VMM 102, and the corresponding page of guest memory is flagged as dirty in the memory page map 206.

In addition, the VMM 102 may maintain a "synchronized-with-disk" flag 212 for each page of guest memory in the memory page map 206 that tracks whether the memory page has been written to a storage device, as will be described below. As long as the synchronized-with-disk flags 212 for all pages of guest memory in the memory page map 206 are not set, then the replication engine 202 copies the dirty pages of guest memory 210 (also referred to herein singularly as dirty page of guest memory 210) to the secondary host computer 104B on a continuous basis, where they are aggregated. The replication engine 202 and/or the VMM 102 may then mark the corresponding pages of guest memory as clean in the memory page map 206 as the copy operations are completed.

At certain intervals, the replication engine 202 performs a synchronization, wherein the execution of the guest OS 114 and applications in the primary virtual machine 108 is suspended, and the remaining dirty pages of guest memory 210 are copied to the secondary host computer 104B. The replication engine 202 then sends a checkpoint to the secondary host computer 104B along with the current state of any virtual devices and the CPU, and execution of the guest OS 114 in the primary virtual machine 108 is resumed. Upon receiving the checkpoint, virtual device state, and CPU state, the replication engine 202 and VMM 102 executing on the secondary host computer 104B apply the aggregated dirty pages of guest memory 210 copied from the primary virtual machine to the memory of the replicated virtual machine 204 and update the CPU state for the replicated virtual machine, thus making the state of the replicated virtual machine synchronized with that of the primary virtual machine 108 at the checkpoint time.

It will be appreciated that in order to maintain state consistency at the checkpoint level, the VMM on 102 on the primary host computer 104A may queue all disk writes, network output, and the like that occurs in the primary virtual machine 108 between synchronization operations. Once the state of the primary virtual machine 108 has been fully replicated to the replicated virtual machine, the queues are flushed and the disk writes and network transmissions are performed. It will be further appreciated that the checkpoint interval may be very short, such as 100 ms, for example, thus the synchronizations may occur frequently during the operation of the primary virtual machine 108.

Figure 3:
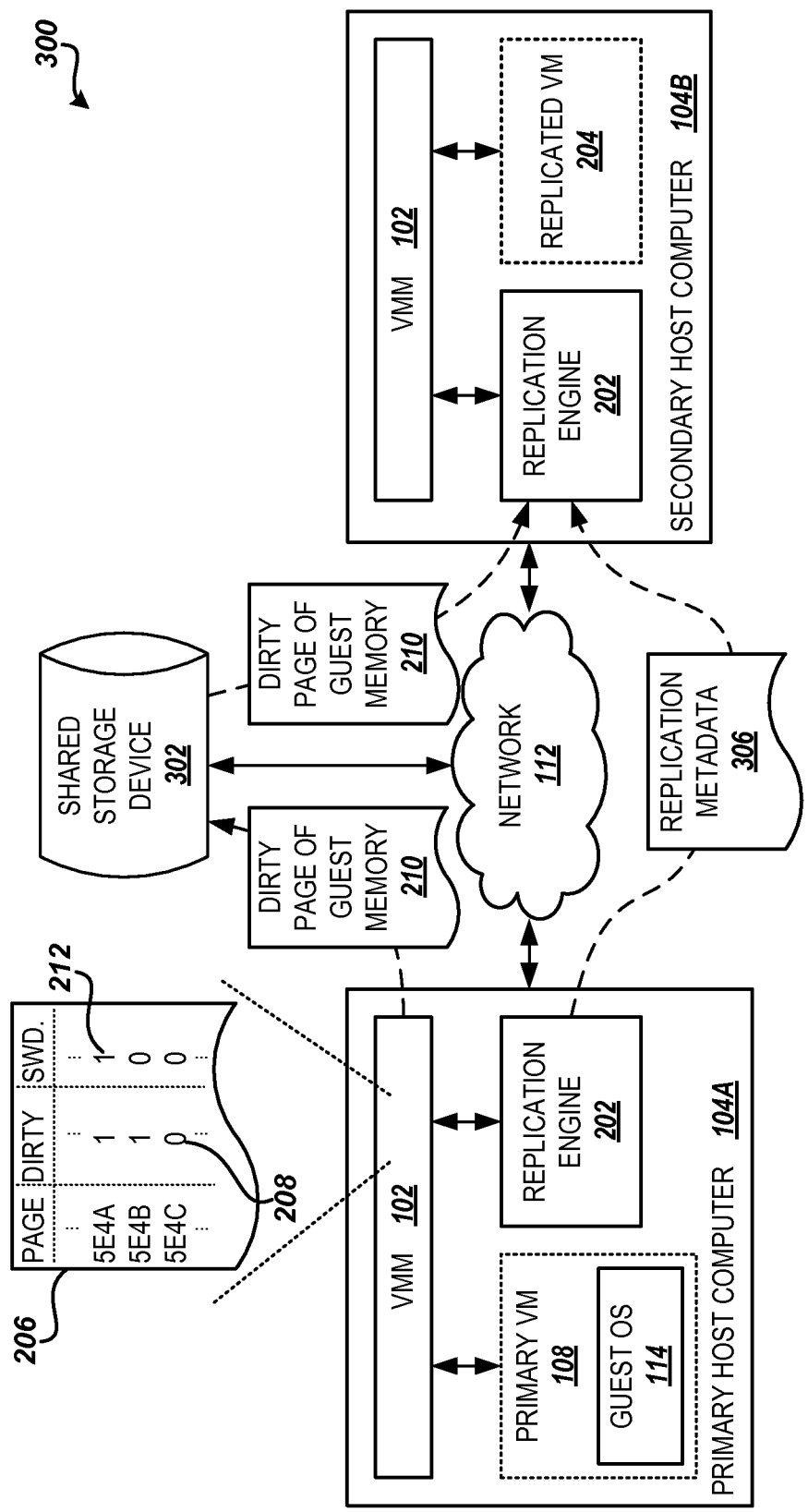
FIG. 3 is a block diagram showing an illustrative VM-HA environment that further utilizes a shared storage device to improve the efficiency of replication of the state of the primary virtual machine to the replicated virtual machine, according to embodiments presented herein.

FIG. 3 illustrates a VM-HA environment 300 in which a shared storage device 302 is utilized to improve the efficiency of replication process. According to embodiments, the shared storage device may be any storage device accessible to both the primary host computer 104A and the secondary host computer 104B, such as a storage-area network ("SAN") target accessible across the network 112, a disk drive on a common storage bus, a solid-state memory device, and the like. As described above, the guest OS 114 executing in the primary virtual machine 108 may frequently write pages of guest memory to a page cache on the shared storage device. The writes to the page cache can be handled by the VMM 102 on the primary host computer 104A. In addition, the actual writes to the page cache will queue with the other disk writes, network output, and the like that occur between checkpoints, and the queued writes will be flushed to the shared storage device 302 upon synchronization.

According to embodiments, the VMM 102 in the VM-HA environment 300 uses the combination of the dirty flag 208 and the synchronized-with-disk flag 212 in the memory page map 206 to optimize the synchronization of dirty pages of guest memory 210 by leveraging the shared storage device 302. As described above, when a page of guest memory is written to by the guest OS 114 executing in the primary virtual machine 108, the VMM 102 traps the memory write and marks the page as dirty in the memory page map 206. The dirty pages of guest memory 210 may get copied by the replication engine 202 to the secondary host computer 104B between checkpoints as part of the standard replication process.

However, if the VMM 102 receives a request to write a page of guest memory to the shared storage device 302 and the page is marked dirty in the memory page map 206, then the VMM 102 on the primary host computer 104A marks that page in the memory page map 206 as synchronized-with-disk using the synchronized-with-disk flag 212. During the replication process, if the replication engine 202 encounters a dirty page of guest memory that is also marked as synchronized-with-disk, the replication engine 202 does not copy the dirty page of guest memory 210 to the secondary host computer 104B. Instead the replication engine 202 records replication metadata 306 indicating the location, e.g., a disk offset, where the page was stored on the shared storage device. The metadata 306 can then be used by the secondary host computer 104B to fetch the dirty page of guest memory 210 from the shared storage device 302 during synchronization at the end of the checkpoint interval. After the replication operation is complete, the page of guest memory is marked as clean in the memory page map 206.

According to one embodiment, the replication metadata 306 containing the location of dirty pages of guest memory 210 on the shared storage device 302 is aggregated in the replication engine 202 on the primary host computer 104A and sent to secondary host computer 104B with the checkpoint and CPU state at the end of the checkpoint interval. During synchronization of the replicated virtual machine 204, the replication engine 202 and/or the VMM 102 executing on the secondary host computer 104B can retrieve the dirty pages of guest memory 210 specified in the replication metadata 306 from the indicated location on the shared storage device 302 and apply the retrieved dirty pages of guest memory to the memory of the replicated virtual machine 204. Thus dirty pages of guest memory 210 from the primary virtual machine 108 that are written to the shared storage device 302 during the checkpoint interval need not be copied between the primary host computer 104A and the secondary host computer 104B over the network 112 for replication, thus reducing the amount of network bandwidth required in the replication process.

According to a further embodiment, if the primary virtual machine 108 writes to a page of guest memory that is already marked as dirty and synchronized-with-disk in the memory page map 206, then the synchronized-with-disk flag 212 for that page is cleared by the VMM 102. In addition, if the VMM 102 receives a request to write a page of guest memory to a location on the shared storage device 302 that currently contains a page of guest memory marked as synchronized-withdisk in the memory page map 206, the VMM 102 queues the write and delays application of the queued write until the dirty page of guest memory 210 is retrieved by the replication engine 202 on the secondary host computer 104B during synchronization. For example, the secondary host computer 104B may lazily read the dirty pages of guest memory 210 from the shared storage device 302. If a write to a location on the shared storage device 302 containing a dirty page of guest memory 210 occurs on the primary host computer 104A, the VMM 102 on the secondary host computer 104B may not have yet read the page from the shared storage device. In one embodiment, upon receiving a request from the primary virtual machine 104 to write to a location on the shared storage device 302 containing a dirty page of guest memory 210, the VMM 102 on the primary host computer 104A sends a signal to the VMM on the secondary host computer 104B to instruct the VMM to retrieve the dirty page of guest memory 210 from the location(s) on the shared storage device 302. The VMM 102 the secondary host computer 104B may then send an acknowledgment back to the VMM on the primary host computer 104A once the page of guest memory has been retrieved.

In another embodiment, the VMM 102 may track writes to pages of guest memory in the memory of the primary virtual machine 108 and subsequent writes of those pages of guest memory to particular locations on the shared storage device 302. This may allow the VMM 102 to determine the probability the guest OS 114 will write the page of guest memory to the tracked location on the shared storage device 302 given that a write to the page of guest memory has occurred in the primary virtual machine 108. The VMM 102 may then utilize this tracking information to perform predictive writes of dirty pages of guest memory 210 to the shared storage device 302 to further optimize the replication process. If a write to a page of guest memory in the primary virtual machine 108 occurs that is usually followed by a write of the page of guest memory to particular block(s) in the page cache on the shared storage device 302, then it is also likely that the write of the page of guest memory to the shared storage device may be delayed until a subsequent checkpoint interval in the replication process. In this case, the dirty page of guest memory 210 would be copied by the replication engine 202 to the secondary host computer 104B within the current checkpoint interval instead of being retrieved from the shared storage device 302 at the next synchronization.

At or near the end of a checkpoint interval, the VMM 102 may utilize the tracking information to locate pages of guest memory in the memory page map 206 that are marked dirty and that are likely to be followed by a write of the page of guest memory to tracked block(s) on the shared storage device 302, but the write of the page of guest memory to the shared storage device has not yet occurred in the checkpoint interval. In these scenarios, the VMM 102 may simply write the page of guest memory to the block(s) of the shared storage device 302, transferring any existing contents of the block(s) to a private area of the storage device. The private area may be locations on the shared storage device 302 that are separate from the locations where data for the guest OS are stored that is used as a buffer by the VMM 102. Such pages of guest memory may then be marked as synchronized-with-disk and disk-I/O-pending in the memory page map 206. The replication engine 202 may then send the replication metadata 306 indicating the location of the dirty page of guest memory 210 on the shared storage device 302 to the secondary host computer 104B during replication, avoiding the copy of the dirty page of guest memory over the network 112.

If a read targeting the block(s) on the shared storage device 302 is received by the VMM 102, then the VMM will map the read to the private area. If the write of the page of guest memory to the block(s) of the shared storage device 302 subsequently occurs as expected, then the previous contents of the block(s) written to the private area may be discarded, and the page of guest memory may simply be marked as synchronized-with-disk in the memory page map 206. If, however, the write of the page of guest memory to the block (s) of the shared storage device 302 does not subsequently occur in a certain timeout interval, such as 5 checkpoint intervals, or if a different write targeting the block(s) is received by the VMM 102, then the VMM 102 may rollback the write of the block(s) on the shared storage device using the contents of the private area, after ensuring that the dirty page of guest memory 210 written to the blocks has been retrieved by the replication engine 202 and/or VMM 102 on the secondary host computer 104B during synchronization of the replicated virtual machine 204.

According to embodiments, the performance of the transfer of data to the shared storage device 302 from the primary and secondary host computers 104 may be used as a factor for determining the threshold probability of a page write occurring given that a write to the corresponding page of guest memory has occurred that must be exceeded before a predictive write of the dirty page of guest memory 210 is performed by the VMM 102. In one embodiment, if the performance of the data transfer to the shared storage device 302 exceeds that of transfer of dirty pages of guest memory 210 across the network 112, the VMM 102 may predictively write every dirty page of guest memory to the shared storage device 302 using the method described above.

According to a further embodiment, if the guest OS 114 executing in the primary virtual machine 108 is paravirtualized and provides an interface allowing the VMM 102 to request I/O flushes, and, at or near the end of a checkpoint interval, the VMM locates a page of guest memory that is dirty but has not been written to the shared storage device 302, then the VMM may request an I/O flush of the dirty page of guest memory 210 before suspending execution of the primary virtual machine 108. The determination of whether to request the I/O flush for the page of guest memory may be based on the same tracking information utilized above for the predictive writes, for example.

If the paravirtualized guest OS 114 in the primary virtual machine 108 honors the request to flush the dirty page of guest memory 210 to the shared storage device 302, then the VMM 102 need not perform the predictive write of the dirty page of guest memory 210. If, however, the guest OS 114 in the primary virtual machine 108 does not honor the request to flush the dirty page of guest memory to the shared storage device 302, then the VMM 102 may still perform the predictive write of the dirty page of guest memory 210 by copying the previous contents of the corresponding block(s) on the storage device to the private area and marking the page of guest memory as synchronized-with-disk and disk-I/O-pending in the memory page map 206.

Figure 4:
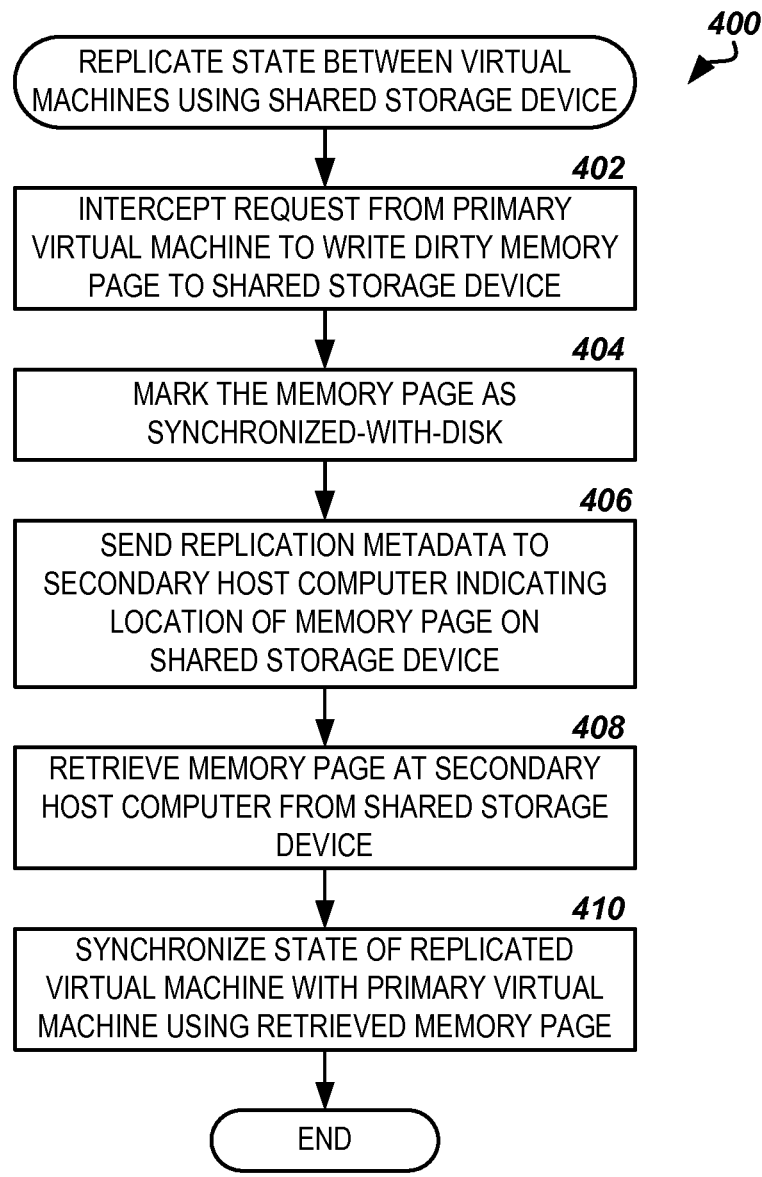
FIG. 4 is a flow diagram showing one method for replicating the state of the primary virtual machine to the replicated virtual machine using the shared storage device, according to embodiments described herein.
Figure 5A:
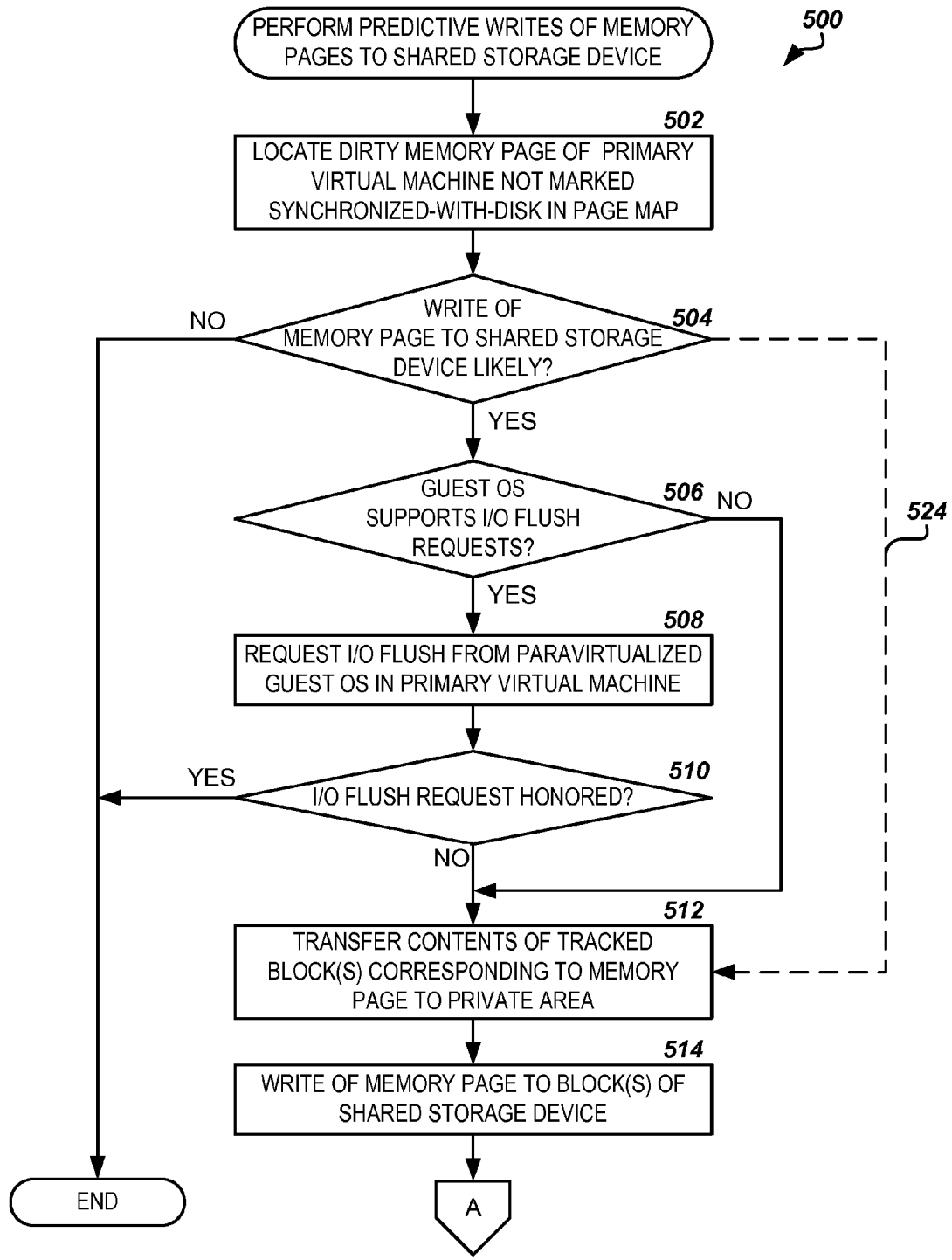
FIGS. 5A and 5B are flow diagrams showing one method for performing predictive writes of pages of guest memory to the shared storage device in order to further optimize replication of the state of the primary virtual machine to the replicated virtual machine, according to embodiments described herein.
Figure 5B:
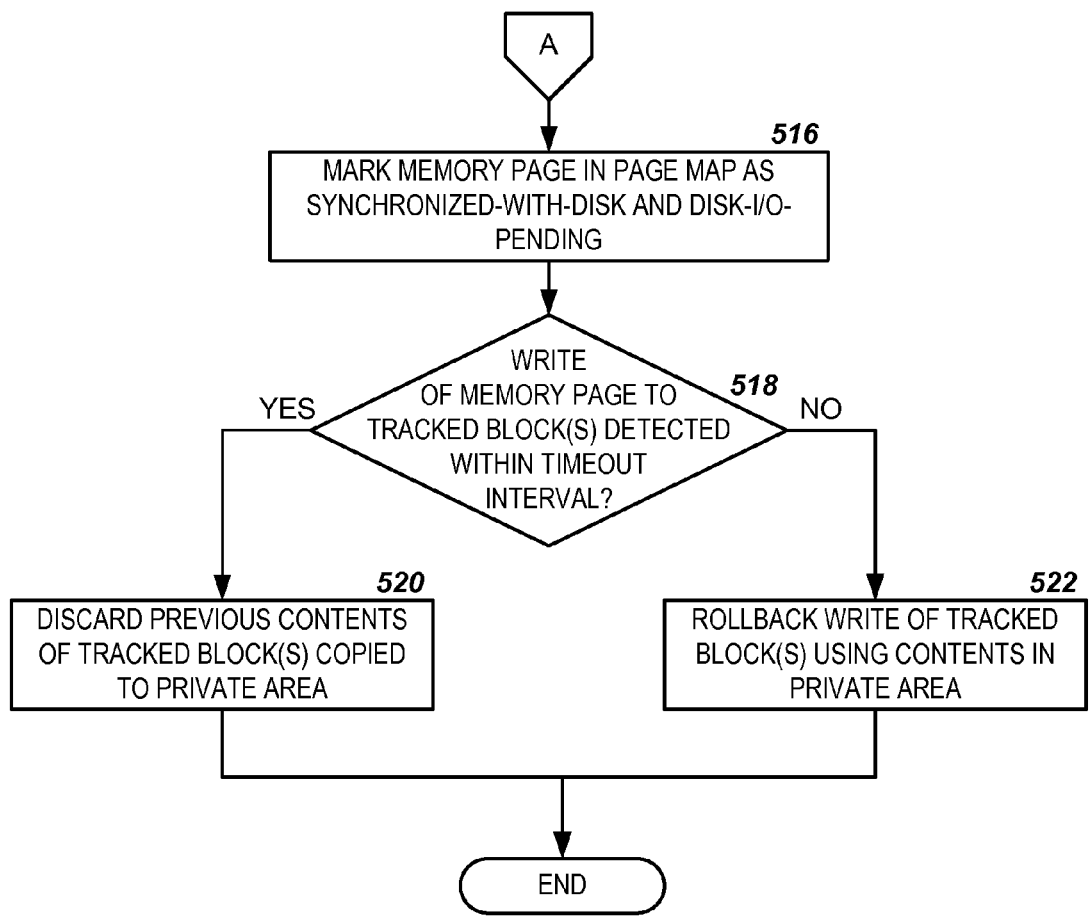

Turning now to FIGS. 4-5B, additional details will be provided regarding the embodiments presented herein for utilizing shared storage for efficient VM-HA. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as operations, structural devices, acts, or modules. These operations, structural devices, acts, and modules may be implemented in software, in firmware, in special purpose digital logic, and any combination thereof. It should also be appreciated that more or fewer operations may be performed than shown in the figures and described herein. These operations may also be performed in parallel, or in a different order than those described herein.

FIG. 4 illustrates one routine 400 for replicating the state of a primary virtual machine 108 to a replicated virtual machine 204 using the shared storage device 302, according to embodiments described herein. The routine 400 may be performed by the VMM 102 and the replication engine 202 executing on both the primary host computer 104A and the secondary host computer 104B, by another module or component in the VM-HA environment 300, or by any combination of modules and components.

The routine 400 begins at operation 402, where the VMM 102 executing on the primary host computer 104A receives a write issued by the guest OS 114 executing in the primary virtual machine of a dirty page of guest memory 210 to the shared storage device 302. The VMM 102 may determine whether the page of guest memory being written to the shared storage device 302 is dirty by checking the dirty flag 208 in the memory page map 206 corresponding to the primary virtual machine 108, for example. Upon detecting the write of the dirty page of guest memory 210 to the shared storage device 302, the routine proceeds from operation 402 to operation 404, where the VMM 102 queues the write and marks the page of guest memory in the memory page map 206 as synchronized-with-disk using the synchronized-with-disk flag 212.

From operation 404, the routine proceeds to operation 406, where the replication engine 202 executing on the primary host computer sends replication metadata to the secondary host computer 104B hosting the replicated virtual machine 204 indicating the location of the dirty page of guest memory 210 on the shared storage device 302. According to one embodiment, when the replication engine 202 performing the replication process encounters a page of guest memory that is marked as both dirty and synchronized-with-disk, the replication engine does not copy the dirty page of guest memory 210 to the secondary host computer 104B, but instead records the replication metadata 306 indicating the location on the shared storage device 302 to which the dirty page of guest memory was written by the VMM 102. The page of guest memory is then marked as clean in the memory page map 206. At the end of the checkpoint interval, the recorded replication metadata 306 is sent to the secondary host computer 104B along with the checkpoint and CPU state.

The routine 400 proceeds from operation 406 to operation 408, where the replication engine 202 and/or VMM 102 executing on the secondary host computer 104B retrieve the dirty page of guest memory 210 from the shared storage device 302. As described above in regard to FIG. 3, during synchronization of the replicated virtual machine 204 at the end of the checkpoint interval, the replication engine 202 and/or VMM 102 retrieve the dirty pages of guest memory 210 specified in the replication metadata 306 from the indicated locations on the shared storage device 302.

From operation 408, the routine 400 proceeds to operation 410, where the replication engine 202 and VMM 102 on the secondary host computer 104B utilize the retrieved dirty page of guest memory 210 to synchronize the state of the replicated virtual machine 204. As further described above, the replication engine 202 and/or VMM 102 apply the dirty pages of guest memory 210 retrieved from the shared storage device 302 to the memory of the replicated virtual machine 204 as indicated in the replication metadata 306. The dirty pages of guest memory 210 retrieved from the shared storage device 302 are applied to the memory of the replicated virtual machine 204 along with the aggregated dirty pages of guest memory copied directly to the secondary host computer 104B from the primary virtual machine 108 in order to synchronize the state of the replicated virtual machine with that of the primary virtual machine 108 at the end of the checkpoint interval. From operation 410, the routine 400 ends.

FIGS. 5A and 5B illustrate a routine 500 for performing predictive writes of pages of guest memory to the shared storage device 302 in order to further optimize replication of the state of the primary virtual machine 108 to the replicated virtual machine 204. The routine 500 may be performed by the VMM 102 executing on the primary host computer 104A, by another module or component of the management OS 110 executing on the host computer, or by any combination of modules and components. According to one embodiment, the routine 500 is performed by the VMM 102 at or near the end of the checkpoint interval, before the execution of the guest OS 114 and applications in the primary virtual machine 108 is suspended.

The routine 500 begins at operation 502, where the VMM 102 locates a dirty page of guest memory 210 in the memory page map 206 corresponding to the primary virtual machine 108 that is not marked synchronize-with-disk. This indicates that the page of guest memory in the memory of the primary virtual machine was written to in the checkpoint interval but has not (yet) been committed to the shared storage device. The VMM 102 may locate these pages of guest memory by scanning the dirty flags 208 and synchronized-with-disk flags 212 of the pages of guest memory in the memory page map 206, for example. From operation 502, the routine 500 proceeds to operation 504, where the VMM 102 determines whether a write of the dirty page of guest memory 210 to particular block(s) of the shared storage device 302 is likely given that the page of guest memory was written to in the checkpoint interval. As described above, the VMM 102 may determine the probability that a page write to the block(s) of the shared storage device 302 will occur given that a write to the page of guest memory has occurred based on tracking information collected across checkpoint intervals in operation of the primary virtual machine 108.

If the page write is not likely, then the routine 500 ends. However, if a write of the page of guest memory to the shared storage device is likely, but is delayed beyond the end of the checkpoint interval, then the routine 500 proceeds from operation 504 to operation 506, where the VMM 102 determines whether the guest OS 114 executing in the primary virtual machine 108 supports I/O flush requests. For example, as further described above, a paravirtualized guest OS 114 may support an interface for requesting I/O flushes. If the guest OS 114 supports I/O flush requests, then the routine proceeds from operation 506 to operation 508, where the VMM 102 utilizes the paravirtualized interface of the guest OS 114 executing in the primary virtual machine 108 to request an I/O flush of the page of guest memory by the guest OS. At operation 510, if the I/O flush request is honored, the routine 500 ends and the guest OS 114 flushes the dirty page of guest memory 210 to the shared storage device 302 and the synchronized-with-disk flag 212 is set for the page of guest memory, thereby obviating the need for the dirty page of guest memory 210 to be copied to the secondary host computer 104B by the replication engine 202 in the replication process.

However, if it is determined in operation 506 that the guest OS 114 executing in the primary virtual machine 108 does not support I/O flush requests, or if I/O flush request made in operation 508 is not honored, then the routine 500 proceeds to operation 512, where the VMM 102 transfers the existing contents, if any, in the tracked block(s) of the shared storage device 302 corresponding to the dirty page of guest memory 210 to a private area of the storage device, as described above in regard to FIG. 3. As further described above, any subsequent read from the primary virtual machine 108 targeting the block(s) on the shared storage device 302 received by the VMM 102 will be mapped to this private area. In another embodiment, upon determining that a write of the page of guest memory to the shared storage device is likely in operation 504, the routine 500 proceeds to operation 512 without checking for I/O flush request support in the guest OS 114 and without requesting an I/O flush of the page of guest memory from the guest OS, as shown at line 524 in FIG. 5.

Next, the routine 500 proceeds from operation 512 to operation 514, where the VMM 102 writes the page of guest memory to the tracked block(s) of the shared storage device 302 and then marks the dirty page of guest memory 210 as synchronized-with-disk and disk-I/O-pending in the memory page map 206, as indicated at operation 516 shown in FIG. 5B. In this manner, the replication engine 202 performing the replication process need not copy the dirty page of guest memory 210 to the secondary host computer 104B across the network, and the secondary host computer may simply retrieve the dirty page of guest memory 210 from the shared storage device 302 during synchronization.

From operation 516, the routine 500 proceeds to operation 518, where the VMM 102 detects whether the expected write of the dirty page of guest memory 210 to the block(s) of the shared storage device 302 by the primary virtual machine 108 occurs within a certain timeout interval, such as 5 checkpoint intervals. If the write of the dirty page of guest memory 210 occurs as expected, the routine proceeds from operation 518 to operation 520, where the VMM 102 discards the previous contents of the block(s) written to the private area, and the page of guest memory is marked as synchronized-with-disk in the memory page map 206. If, however, the write of the page of guest memory to the block(s) on the shared storage device 302 does not subsequently occur in the timeout interval, or if a different write targeting the block(s) is received by the VMM 102, then the routine proceeds from operation 518 to operation 522, where the VMM 102 rolls-back the write of the block(s) on the shared storage device using the contents of the private area, after ensuring that dirty page of guest memory 210 written to the blocks has been retrieved by the replication engine 202 and/or VMM 102 on the secondary host computer 104B for synchronization of the replicated virtual machine 204. From operations 520 or 522, the routine 500 then ends.

Figure 6:
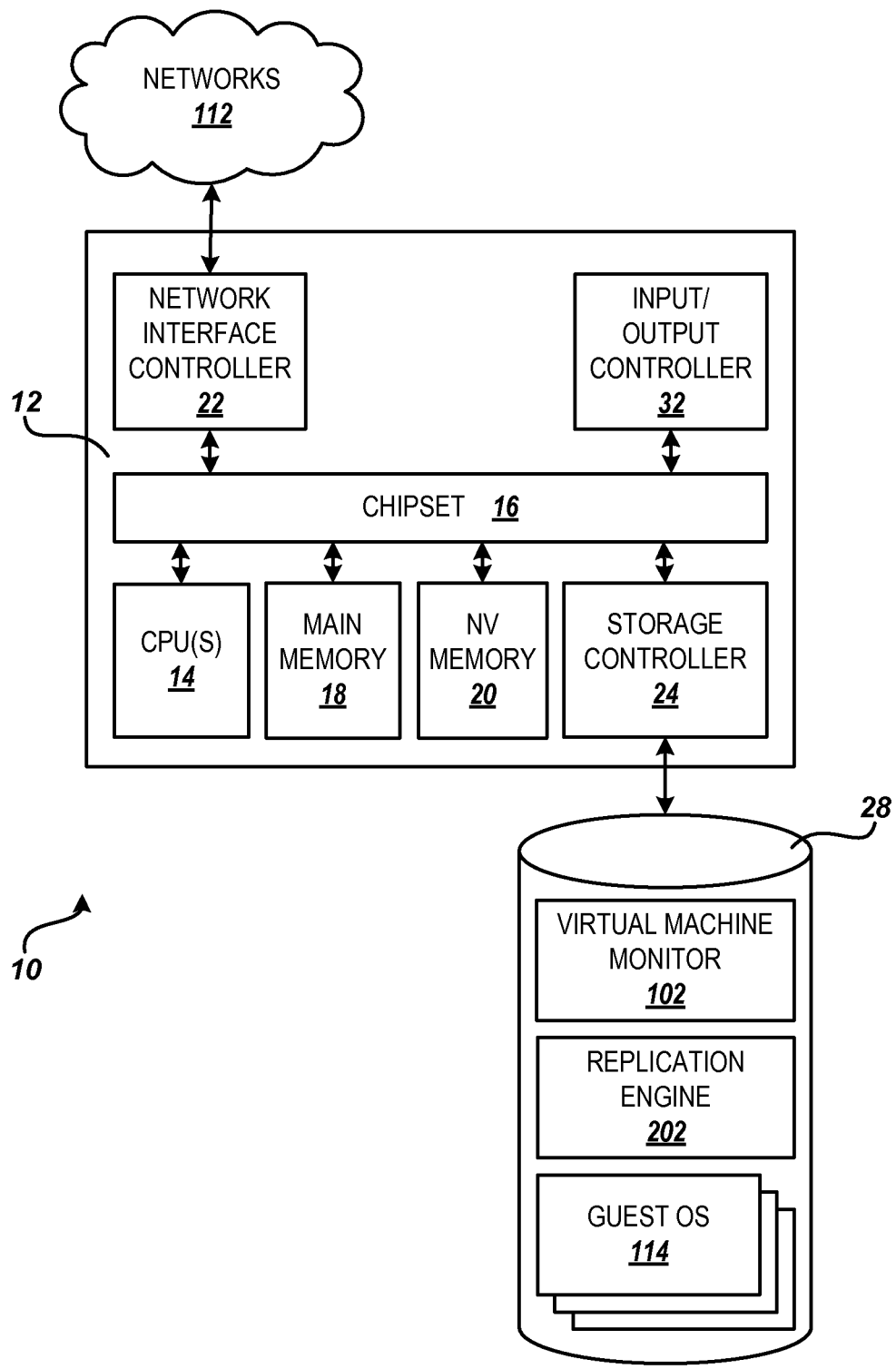
FIG. 6 is a computer architecture diagram showing an illustrative computer hardware architecture for computing devices described in embodiments presented herein.

FIG. 6 shows an example computer architecture 10 for a computer 12 capable of executing the software components described herein for utilizing shared storage for efficient VM-HA, in the manner presented above. The computer architecture 10 shown in FIG. 6 illustrates a conventional server computer, workstation, desktop computer, laptop, PDA, electronic book reader, digital wireless phone, network appliance, set-top box, or other computing device, and may be utilized to execute any aspects of the software components presented herein described as executing on the host computers 104 or other computing platform.

The computer 12 includes a baseboard, or "motherboard," which is a printed circuit board to which a multitude of components or devices may be connected by way of a system bus or other electrical communication paths. In one illustrative embodiment, one or more central processing units ("CPUs") 14 operate in conjunction with a chipset 16. The CPUs 14 are standard programmable processors that perform arithmetic and logical operations necessary for the operation of the computer 12.

The CPUs 14 perform the necessary operations by transitioning from one discrete, physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits, including registers, adders-subtractors, arithmetic logic units, floating-point units, or the like.

The chipset 16 provides an interface between the CPUs 14 and the remainder of the components and devices on the baseboard. The chipset 16 may provide an interface to a main memory 18 of the computer 12, such as a random access memory. The chipset 16 may further provide an interface to a non-volatile memory 20, such as a read-only memory ("ROM") or non-volatile RAM ("NVRAM") for storing basic routines that that help to startup the computer 12 and to transfer information between the various components and devices. The non-volatile memory 20 may also store other software components necessary for the operation of the computer 12 in accordance with the embodiments described herein.

According to various embodiments, the computer 12 may operate in a networked environment using logical connections to remote computing devices and computer systems through a network, such as a local-area network ("LAN"), a wide-area network ("WAN"), the Internet, or any other networking topology known in the art that connects the computer 12 to remote computers. The chipset 16 includes functionality for providing network connectivity through a network interface controller ("NIC") 22, such as a gigabit Ethernet adapter. For example, the NIC 22 may be capable of connecting the computer 12 to other computing devices, such as storage devices 116, databases 118, other host computers 120, and the like across the networks 112 described above in regard to FIG. 1. It should be appreciated that any number of NICs 22 may be present in the computer 12, connecting the computer to other types of networks and remote computer systems.

The computer 12 may be connected to a mass storage device 28 that provides non-volatile storage for the computer. The mass storage device 28 may store system programs, application programs, other program modules, and data, which are described in greater detail herein. The mass storage device 28 may be connected to the computer 12 through a storage controller 24 connected to the chipset 16. The mass storage device 28 may consist of one or more physical storage units. The storage controller 24 may interface with the physical storage units through a serial attached SCSI ("SAS") interface, a serial advanced technology attachment ("SATA") interface, a fiber channel ("FC") interface, or other standard interface for physically connecting and transferring data between computers and physical storage devices.

The computer 12 may store data on the mass storage device 28 by transforming the physical state of the physical storage units to reflect the information being stored. The specific transformation of physical state may depend on various factors, in different implementations of this description. Examples of such factors may include, but are not limited to, the technology used to implement the physical storage units, whether the mass storage device 28 is characterized as primary or secondary storage, or the like. For example, the computer 12 may store information to the mass storage device 28 by issuing instructions through the storage controller 24 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 12 may further read information from the mass storage device 28 by detecting the physical states or characteristics of one or more particular locations within the physical storage units.

In addition to the main memory 18, non-volatile memory 20, and mass storage device 28 described above, the computer 12 may have access to other computer-readable medium to store and retrieve information, such as program modules, data structures, or other data. It should be appreciated by those skilled in the art that computer-readable media can be any available media that may be accessed by the computer 12, including computer-readable storage media and communications media. Communications media includes transitory signals. Computer-readable storage media includes volatile and non-volatile, removable and non-removable storage media implemented in any method or technology. For example, computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information.

The mass storage device 28 may store software programs executed on the computer 12, such as the VMM 102, the replication engine 202, one or more guest OSs 114, and other applications, each of which was describe above in regard to FIG. 1. The mass storage device 28 may further store other system or application programs and data utilized by the computer 12. In one embodiment, the mass storage device 28 or other computer-readable storage media may be encoded with computer-executable instructions that, when loaded into the computer 12, may transform the computer from a general-purpose computing system into a special-purpose computer capable of implementing the embodiments described herein. These computer-executable instructions transform the computer 12 by specifying how the CPUs 14 transition between states, as described above. According to one embodiment, the computer 12 may have access to computer-readable storage media storing computer-executable instructions that, when executed by the computer, perform the routines 400 and 500 for utilizing shared storage for efficient VM-HA, as described above in regard to FIGS. 4-5B.

The computer 12 may also include an input/output controller 32 for receiving and processing input from a number of input devices, such as a keyboard, a mouse, a touchpad, a touch screen, an electronic stylus, or other type of input device. Similarly, the input/output controller 32 may provide output to a display device, such as a computer monitor, a flat-panel display, a digital projector, a printer, a plotter, or other type of output device. It will be appreciated that the computer 12 may not include all of the components shown in FIG. 6, may include other components that are not explicitly shown in FIG. 6, or may utilize an architecture completely different than that shown in FIG. 6.

Based on the foregoing, it should be appreciated that technologies for utilizing shared storage for efficient VM-HA are presented herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts, and mediums are disclosed as example forms of implementing the claims.

The subject matter described above is provided by way of illustration only and should not be construed as limiting. Furthermore, the claimed subject matter is not limited to implementations that solve any or all disadvantages noted in any part of this disclosure. Various modifications and changes may be made to the subject matter described herein without following the example embodiments and applications illustrated and described, and without departing from the true spirit and scope of the present invention, which is set forth in the following claims.

What is claimed is:

1. A non-transitory computer-readable storage medium having computer-executable instructions stored thereon that, when executed by a computer, cause the computer to:

receive a request from a primary virtual machine to write a page of guest memory to a storage device, the page of guest memory being marked as dirty in a memory page map associated with the primary virtual machine, wherein a state of the primary virtual machine is being replicated with a replicated virtual machine running on a secondary host computer;

upon receiving the request and queuing an operation to write the page of guest memory to a location on the storage device, mark the page of guest memory as synchronized-with-disk in the memory page map;

record replication metadata indicating the location of the page of guest memory on the storage device;

send the replication metadata to the secondary host computer, the replication metadata being usable by the secondary host computer to retrieve the page of guest memory from the storage device and synchronize the state of the replicated virtual machine with the primary virtual machine using the retrieved page of guest memory; and mark the page of guest memory as clean in the memory page map.

2. The non-transitory computer-readable storage medium of claim 1, having further computer-executable instructions stored thereon that cause the computer to:

near an end of a checkpoint interval in the replication, locate a second page of guest memory marked as dirty and marked as not written to the storage device during the checkpoint interval in the memory page map;

determine that a probability of a write of the second page of guest memory to a particular location on the storage device given that the second page of guest memory was written to exceeds a threshold value based on tracking information collected across checkpoint intervals in the replication;

upon determining that the probability of the write of the second page of guest memory to the particular location on the storage device exceeds the threshold value, transfer a contents of the particular location on the storage device to a private area;

write the second page of guest memory to the particular location on the storage device;
mark the second dirty page of guest memory as synchronized-with-disk and disk-I/O-pending in the memory page map;
determine that the write of the second page of guest memory to the particular location on the storage device by the primary virtual machine was detected within a timeout interval;
upon determining that the write of the second page of guest memory to the particular location on the storage device by the primary virtual machine was not detected within the timeout interval, rollback the write of the second page of guest memory to the particular location on the storage device using the contents transferred to the private area; and
upon determining that the write of the second page of guest memory to the particular location on the storage device by the primary virtual machine was detected within the timeout interval, discard the contents transferred to the private area.

3. The non-transitory computer-readable storage medium of claim 2, having further computer-executable instructions stored thereon that cause the computer to:
upon determining that the probability of the write of the second page of guest memory to the particular location on the storage device exceeds the threshold value, requesting an I/O flush of the second page of guest memory by a guest OS executing in the primary virtual machine; and
in response to receipt of an indication that the guest OS did not issue the I/O flush, transfer the contents of the particular location on the storage device to the private area, write the second dirty page of guest memory to the particular location on the storage device, and mark the second dirty page of guest memory as synchronized-with-disk and disk-I/O-pending in the memory page map.

4. The non-transitory computer-readable storage medium of claim 3, wherein the guest OS executing in the primary virtual machine is paravirtualized and supports an interface for requesting I/O flushes.

5. A computer-implemented method to utilize a shared storage device to increase efficiency of a replication process in VM-HA, the method comprising:
receiving a request from a primary virtual machine hosted on a primary host computer to write a dirty page of guest memory allocated to the primary virtual machine to the shared storage device, the shared storage device accessible by the primary host computer and a secondary host computer hosting a replicated virtual machine;
upon receiving the request, marking the dirty page of guest memory as synchronized-with-disk in a memory page map associated with the primary virtual machine; and
sending, from a replication engine residing on the primary host computer, replication metadata to the secondary host computer, the replication metadata indicating a location of the dirty page of guest memory on the shared storage device, wherein the secondary host computer is configured to retrieve the dirty page of guest memory from the shared storage device and synchronize a state of the replicated virtual machine with the primary virtual machine using the retrieved dirty page of guest memory.

6. The computer-implemented method of claim 5, wherein the request comprises a flush of the dirty page of guest memory to a page cache located on the shared storage device.

7. The computer-implemented method of claim 5, wherein the request is queued until an end of a checkpoint interval in the replication process.

8. The computer-implemented method of claim 5, further comprising:
trapping a second request from the primary virtual machine to write to the dirty page of guest memory marked as synchronized-with-disk in the memory page map; and
upon trapping the second request, clearing a synchronized-with-disk flag associated with the dirty page of guest memory in the memory page map.

9. The computer-implemented method of claim 5, further comprising:
receiving a second request from the primary virtual machine to write to a location on the shared storage device containing the dirty page of guest memory marked as synchronized-with-disk in the memory page map;
upon receiving the second request, queuing the second request; and
queuing the second request until receipt of an indication that the secondary host computer has retrieved the dirty page of guest memory marked as synchronized-with-disk from the shared storage device.

10. The computer-implemented method of claim 9, further comprising:
upon receiving the second request, sending a signal to the secondary host computer indicating that the secondary host computer is to retrieve the dirty page of guest memory from the location on the shared storage device; and
receiving an acknowledgment from the secondary host computer indicating that the secondary host computer has retrieved the dirty page of guest memory marked as synchronized-with-disk from the shared storage device.

11. The computer-implemented method of claim 5, further comprising:
locating a second dirty page of guest memory of the primary virtual machine not marked as synchronized-with-disk in the memory page map;
determining that the guest OS will issue a request to write the second dirty page of guest memory to the shared storage device;
upon determining that the guest OS will issue a request to write the second dirty page of guest memory to the shared storage, writing the second dirty page of guest memory to the shared storage device; and
marking the second dirty page of guest memory as synchronized-with-disk and disk-I/O-pending in the memory page map.

12. The computer-implemented method of claim 11, wherein locating the second dirty page of guest memory of the primary virtual machine not marked as synchronized-with-disk in the memory page map is performed at or near an end of checkpoint interval in the replication process.

13. The computer-implemented method of claim 11,
wherein determining that the guest OS will issue a request to write the second dirty page of guest memory comprises determining that a probability of a write of the second dirty page of guest memory to a particular location on the shared storage device given that the second dirty page of guest memory was written to exceeds a threshold value based on tracking information collected across checkpoint intervals in the replication process.

14. The computer-implemented method of claim 13, further comprising:

upon determining that the probability of the write of the second dirty page of guest memory to the particular location on the shared storage device exceeds a threshold value, transferring a contents of the particular location on the shared storage device to a private area;

receiving a second request from the primary virtual machine to read from the particular location on the shared storage device; and mapping the second request to the private area.

15. The computer-implemented method of claim 14, further comprising:

determining that the write of the second dirty page of guest memory to the particular location on the shared storage device by the primary virtual machine was detected within a timeout interval;

upon determining that the write of the second dirty page of guest memory to the particular location on the shared storage device by the primary virtual machine was not detected within the timeout interval, rolling back the write of the second dirty page of guest memory to the particular location on the shared storage device using the contents transferred to the private area; and upon determining that the write of the second dirty page of guest memory to the particular location on the shared storage device by the primary virtual machine was detected within the timeout interval, discarding the contents transferred to the private area.

16. The computer-implemented method of claim 11, further comprising:

upon determining that the guest OS will issue a request to write the second dirty page of guest memory to the shared storage device, requesting an I/O flush of the second dirty page of guest memory by a guest OS executing in primary virtual machine; and in response to receipt of an indication that the guest OS did not issue the I/O flush, writing the second dirty page of guest memory to the storage device, and marking the second dirty page of guest memory as synchronized-with-disk and disk-I/O-pending in the memory page map.

17. The computer-implemented method of claim 16, wherein the guest OS executing in the primary virtual machine is paravirtualized and supports an interface for requesting I/O flushes.

18. A system for utilizing a shared storage device to increase efficiency of a replication process in VM-HA, the system comprising:

a primary host computer having a main memory and a processor and hosting a primary virtual machine;

a shared storage device accessible by the primary host computer and a secondary host computer hosting a replicated virtual machine;

a virtual machine monitor residing in the main memory of the primary host computer and configured to cause the processor to receive a request from the primary virtual machine to write a dirty page of guest memory allocated to the primary virtual machine to the shared storage device, and upon receiving the request, marking the dirty page of guest memory as synchronized-with-disk in a memory page map associated with the primary virtual machine; and a replication engine residing in the main memory of the primary host computer and configured to cause the processor to send replication metadata to the secondary host computer, the replication metadata indicating a location of the dirty page of guest memory on the shared storage device, wherein the secondary host computer is configured to retrieve the dirty page of guest memory from the shared storage device and synchronize a state of the replicated virtual machine with the primary virtual machine using the retrieved dirty page of guest memory.

19. The system of claim 18, wherein the virtual machine monitor is further configured to cause the processor to:

locate a second dirty page of guest memory of the primary virtual machine not marked as synchronized-with-disk in the memory page map;

determine that a probability of a write of the second dirty page of guest memory to a particular location on the shared storage device given that the second dirty page of guest memory was written to exceeds a threshold value;

upon determining that the probability of the write of the second dirty page of guest memory to the particular location on the shared storage device exceeds the threshold value, transfer a contents of the particular location on the shared storage device to a private area; and write the second dirty page of guest memory to the particular location on the storage device.

20. The system of claim 19, wherein the probability of the write of the second dirty page of guest memory to the particular location on the shared storage device given that the second dirty page of guest memory was written to is determined from tracking information collected across checkpoint intervals in a replication process.

21. The system of claim 19, wherein the virtual machine monitor is further configured to cause the processor to:

determine that the write of the second dirty page of guest memory to the particular location on the shared storage device by the primary virtual machine was detected within a timeout interval;

upon determining that the write of the second dirty page of guest memory to the particular location on the shared storage device by the primary virtual machine was not detected within the timeout interval, rollback the write of the second dirty page of guest memory to the particular location on the shared storage device using the contents transferred to the private area; and upon determining that the write of the second dirty page of guest memory to the particular location on the shared storage device by the primary virtual machine was detected within the timeout interval, discard the contents transferred to the private area.

* * * * *